S. J. GENDRON.
HOOK.
APPLICATION FILED APR. 12, 1920.

1,369,647.

Patented Feb. 22, 1921.

INVENTOR
Samuel J. Gendron
BY
James J. Sheehy & Co.
ATTORNEYS

UNITED STATES PATENT OFFICE.

SAMUEL J. GENDRON, OF NASHUA, NEW HAMPSHIRE

HOOK.

1,369,647. Specification of Letters Patent. Patented Feb. 22, 1921.

Application filed April 12, 1920. Serial No. 373,322.

*To all whom it may concern:*

Be it known that I, SAMUEL J. GENDRON, a citizen of the United States, residing at Nashua, in the county of Hillsborough and State of New Hampshire, have invented new and useful Improvements in Hooks, of which the following is a specification.

My present invention pertains to snap hooks, and it contemplates the provision of a hook that may be easily applied and one through the medium of which a chain, such for instance non-skid chains for automobile tires, may be quickly and expeditiously applied on the outer casing of an automobile tire.

The invention also contemplates the provision of a snap hook that is also adjustable to various sizes and hence chains of various length may be employed on the tire casing, and the slack therein taken in with but a slight amount of effort on the part of those practising the invention.

The invention in all of its details will be fully understood from the following description and claim when the same are read in connection with the drawings, accompanying and forming part of this specification, in which:

Similar numerals of reference designate corresponding parts in all of the views of the drawings.

Figure 1:
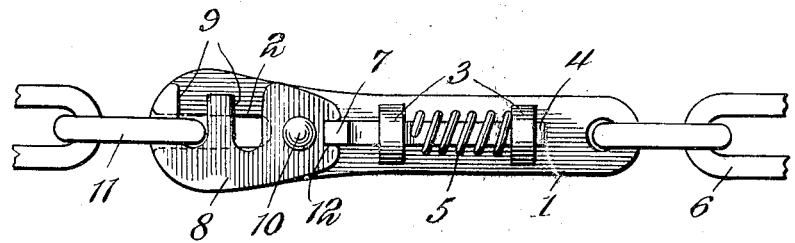
Figure 1 is a view illustrating my novel hook as applied to a portion of chain.

My novel hook comprises a body portion 1, having an aperture in one end thereof into which I pass one link of a chain 6. At its opposite end, the said body 1 is provided with the link-receiving jaw 2 that may be said to be fork-shaped.

Formed integral with the body 1 are straps or guide-ways 3 and I would distinctly have it understood that the said straps may when occasion arises be stamped from the material of the body of the hook without affecting the hook as a whole.

The said straps are so arranged as to receive a plunger 4, that passes through the aperture of each of the straps 3, and the said plunger is provided at one end thereof with a bent end portion 7, for an important purpose hereinafter set forth.

Arranged about and having one end secured in the plunger 4 is a spring 5, and at the end opposite to where it is secured to the plunger 4, the said spring abuts against the strap 3 adjacent the apertured end of the hook 1.

As clearly appears by reference to the drawings, I arrange a swinging member 8 on the hook directly below the forked opening 2 thereof, and the said swinging member is movable with respect to the body 1 and is secured thereto by a bolt or pin 10.

At one end of member 8, I provide a recess 12 and on one face thereof I provide the recesses 9 as illustrated.

Figure 2:
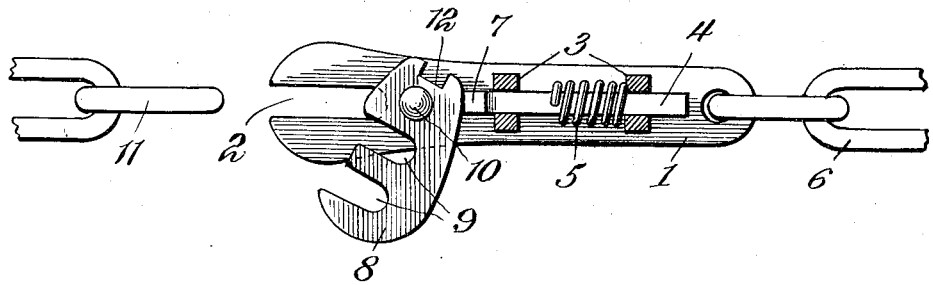
Fig. 2 is a view similar to Fig. 1 and showing the guideways for the plunger of my device in section.
Figure 3:
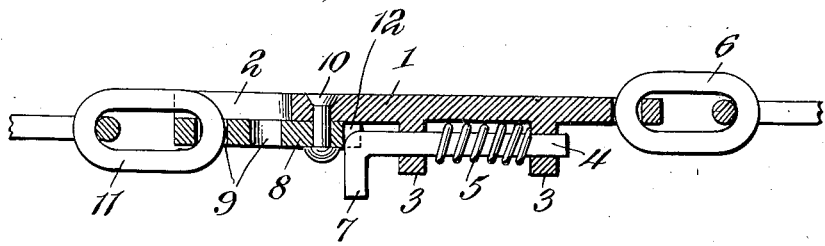
Fig. 3 is a side elevation of Fig. 1 and showing the device in longitudinal section.

In the practical use of the device, when it is desired to secure a link in the forked portion 2, and the hook 1 is in the position shown in Fig. 1, it is simply necessary to push the plunger 4 in the direction of the spring and hence the spring will be placed under tension. Then by holding the plunger so as to unseat the bent end portion 7 from the recess 12 of the swinging member 8, said member may be moved to the position shown in Fig. 2. It will be appreciated that this will open the passage to the forked portion 2 and that a link may be readily inserted therein. Because of the spring 4, it will be simply necessary to return the swinging member to its proper position when the plunger 4 will automatically return to the recess 12, when its bent end portion comes into contact with said recess. It will be noted that the plunger acts as a locking pin and when a chain or other article is properly positioned in the manner shown in Fig. 1, said chain 11 will be retained in a firm and rigid manner and casual displacement from the hook *per se* is precluded.

It will further be noted that the chain 11 may have its link retained either in the recess nearest to the link or to the recess nearest to the pin 10 and hence the device may be utilized in connection with various lengths of chains.

I would distinctly have it understood that I do not wish to be confined in the use of the device to the connection of chains of the character set forth, for the reason that I reserve the right to employ the device in connection with any elements to be connected to which the device is applicable.

The invention is simple in construction and inexpensive to produce and is what may be termed fool-proof. Moreover, when a chain or other device is secured with this hook it will be firmly held in proper position. Moreover the device comprises no delicate parts such as are liable to become inoperative after a very short period of use and because of its construction may be easily applied and as readily removed when occasion demands.

Having described my invention, what I claim and desire to secure by Letters-Patent, is:—

In a hook, the combination of a body portion having a lengthwise slot opening formed from the end and a link-receiving eye in its opposite end, straps formed integral on one side of the body portion and between the lengthwise opening and eye, a swinging member hinged to and movable on the body portion for closing the lengthwise opening of said body portion, recesses formed in one wall of the swinging member for accommodating various lengths of chain and retaining the same within the lengthwise opening, a recess formed in the swinging member at a point in rear of where the member is hinged to the body member, and a plunger adapted to engage the last named recess to limit the swinging member with respect to the body when the swinging member is over the lengthwise opening of said body; said plunger being confined on the body by means of the integral straps thereof.

In testimony whereof I have hereunto set my hand in presence of two subscribing witnesses.

SAMUEL J. GENDRON.

Witnesses:
GEORGE W. CLYDE,
JAMES TRULAND.